(12) United States Patent  (10) Patent No.: US 9,376,222 B2
Jaeger  (45) Date of Patent: Jun. 28, 2016

(54) METHOD OF COOLING SATLET ELECTRONICS

(71) Applicant: NOVAWURKS, INC., Los Alamitos, CA (US)

(72) Inventor: Talbot Jaeger, Los Alamitos, CA (US)

(73) Assignee: NOVAWURKS, INC.

( * ) Notice: Subject to any disclaimer, the term of this patent is extended or adjusted under 35 U.S.C. 154(b) by 105 days.

(21) Appl. No.: 14/538,090

(22) Filed: Nov. 11, 2014

(65) Prior Publication Data

US 2016/0130019 A1   May 12, 2016

(51) Int. Cl.
*B64G 1/66*   (2006.01)
*B64G 1/40*   (2006.01)

(52) U.S. Cl.
CPC ... *B64G 1/66* (2013.01); *B64G 1/40* (2013.01)

(58) Field of Classification Search
CPC .................................. B64G 1/66; B64G 1/40
See application file for complete search history.

(56) References Cited

U.S. PATENT DOCUMENTS

| | | | |
|---|---|---|---|
| 3,152,774 A | 10/1964 | Wyatt | |
| 5,058,834 A | 10/1991 | Hubert | |
| 5,251,852 A | 10/1993 | Pulkowski et al. | |
| 5,332,030 A | 7/1994 | Spencer et al. | |
| 5,417,049 A | 5/1995 | Sackheim et al. | |
| 5,954,298 A | 9/1999 | Basuthakur et al. | |
| 6,073,887 A | 6/2000 | Hosick | |
| 8,240,612 B2 | 8/2012 | Jondeau et al. | |
| 2004/0031331 A1 | 2/2004 | Blakley et al. | |
| 2007/0063105 A1 | 3/2007 | Mann | |
| 2007/0228219 A1 | 10/2007 | Behrens et al. | |
| 2010/0243817 A1 | 9/2010 | McKinnon et al. | |

OTHER PUBLICATIONS

Young, Lee W.; PCT International Search Report; PCT International App. No. PCT/US15/60077; Feb. 10, 2016; 8 pages.

*Primary Examiner* — Justin Benedik
(74) *Attorney, Agent, or Firm* — Russo & Duckworth, LLP; David G. Duckworth

(57) ABSTRACT

A method of cooling spacecraft electronics by transferring fuel between two or more satlets is provided. Each satlet's electronics is thermally coupled to the satlet's fuel tank. A controller connected to a temperature sensor determines that a temperature of a first satlet's electronics is reaching, has reached, or exceeds a predetermined threshold. The controller connected to a second temperature sensor determines that a temperature of a second satlet's propellant is lower than the temperature of the first satlet's electronics. The controller then directs the flow of propellant from the second satlet's fuel tank to the first satlet's fuel tank to cool the first satlet's electronics.

3 Claims, 6 Drawing Sheets

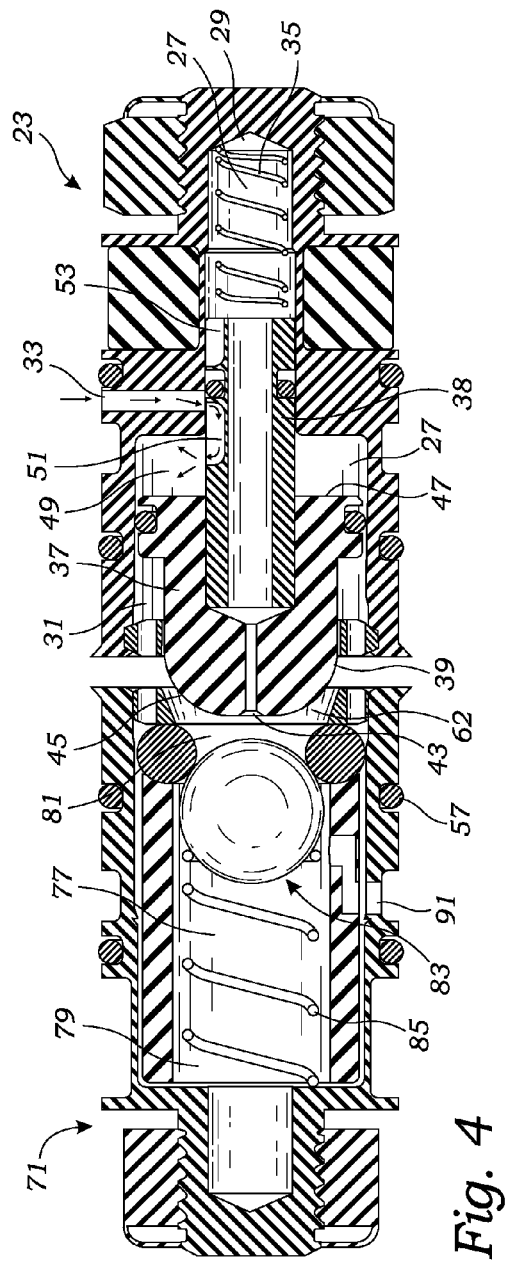

METHOD OF COOLING SATLET ELECTRONICS

This invention was made with government support under contract no. HR0011-14-C-0023 awarded by the Defense Advanced Research Projects Agency. The government has certain rights in the invention.

BACKGROUND OF THE INVENTION

The present invention relates generally to spacecraft engineering and design. More particularly, the present invention relates to thermal control of spacecraft by cooling the spacecraft and its components utilizing transfer of propellant between satlets.

Recently, spacecraft have been designed by combining homogeneous cells, also referred to herein as satlets. The term "satlet" refers to a cell of a cell-based spacecraft where each satlet possesses the traditional architecture of a spacecraft including structure, power, fuel, attitude control and determination, spacecraft processing, etc. Thus, preferably each satlet has its own frame that incorporates multiple spacecraft subsystems including solar panels, batteries, one or more actuator wheels (functioning as a momentum wheel and/or reaction wheel), image sensors, thermal control systems, propulsion system including a fuel tank and thrusters, and electronics for command and data handling, data sharing, attitude control, and position control. Preferably, each satlet is substantially identical so as to be manufactured inexpensively and quickly. The satlets are aggregated together to form a single geographically co-located spacecraft which can seriously increase performance with increased numbers to support payload functions such as communications and surveillance.

Current spacecraft and launch vehicle interfaces employ various electrical connectors and separation systems including pyrotechnically actuated clamp bands, separation nuts, and separation bolts. The spacecraft reconfigurable satlet concept requires that satlets be interconnected by structural, fluid and electrical connectors. Structural, fluid and electrical connectors are often combined to create an "interface" connection. The interface must be capable of transferring structural loads between the two structures. The loads may include vibration, acceleration, thermal conduction, and static loads. For example, U.S. Patent Application Publication No. 2002/0164204 describes a spacecraft interface structure for mechanically connecting various spacecraft components including a spacecraft to a launch vehicle. Furthermore, U.S. patent application Ser. No. 14/444,092 filed Jul. 28, 2014, the disclosure of which is incorporated herein by reference, describes an improved interface connector capable for use to transfer power, data and fluid between satlets.

Moreover, thermal control of spacecraft is an important issue. Each satlet includes one or more electronic components for data processing and spacecraft control. These electronic components produce heat resulting in the need for thermal control. In current spacecraft, heat pipes and external radiators have been used to cool the electronic components. However, the smaller surface area and volume of satlets are not ideal for including heat pipes and external radiators.

Thus, it would be desirable to provide an improved method of cooling satlets and their electronics components.

Moreover, there is a need for an improved method of cooling satlets that does not require heavy and voluminous heat pipes and radiators.

SUMMARY OF THE INVENTION

A method for cooling satlet electronics is provided which includes transferring fuel between a spacecraft's two or more satlets for thermal control of the satlets' electronics. The method of cooling the satlets' electronics comprises the steps of: providing a spacecraft having a plurality of interconnected satlets; determining, by a controller including one or more control processors that the temperature of a first satlet's electronics is reaching, has reached or exceeds a predetermined threshold; determining that a temperature of the propellant of a second satlet is lower than the temperature of the first satlet's electronics; and directing the flow of fuel from the second satlet to the first satlet to control the temperature of the first satlet's electronics.

The spacecraft's satlets are connected together by mechanical, signal, and/or fluid connectors as can be determined by those skilled in the art. However, a preferred connector interface for the transfer of propellant includes at least one male valve assembly and at least one female valve assembly. The interface connector with its male and female valve assemblies is acceptable for use wherever structural and fluid connection is required. In a preferred embodiment, the male valve assembly mounts to a first satlet having a first frame, and the female valve assembly mounts to a second satlet having a second frame. The term "frame" is intended to be interpreted broadly to include any structure or housing of two units to be connected.

The male valve assembly includes a hollow housing forming a central cylindrical bore. The central bore has a proximal end which connects by conduits to a fuel tank and a distal end for mating to the female valve assembly. The connector interface's female valve assembly includes a hollow housing having its own central bore which includes a proximal end connected to a fuel tank, such as by a fuel line.

Advantageously, the pair of connectors, each with its own male and female valve assembly, forms a structural connection as the respective connectors, and satlet, cannot disengage without the connector pistons retracting. Moreover, the connectors form a fluid connection as a fluid flow path is provided from a first fuel tank in the first satlet to a second fuel tank in the second satlet. Preferably more and more satlets are combined utilizing the interface connectors of the present invention to create a larger spacecraft. Specifically, the spacecraft includes at least two satlets. However, it is preferred that the spacecraft include three or more satlets.

The satlets' electronic components may be assembled or integrated on one or more electronic circuit boards. The electronics, including any circuit boards, are thermally coupled to the propellant within the satlet's fuel tank. The electronics may be thermally coupled to the propellant within the fuel tank by various constructions as can be determined by those skilled in the art. For example, the electronics may be positioned adjacent to the fuel tank and thermally coupled by thermally conductive structural members including the fuel tank itself. Alternatively, the satlet's electronics may be positioned interior to the fuel tank and heat transfer may take place through convection between the electronics and propellant. A preferred propellant is R134 tetrafluoroethane. However, other propellants including cold gases, mono-propellants such as hydrazine, or bi-propellants, including the oxidizer, may be acceptable for cooling electronics.

Advantageously, it is an object of the present invention to provide thermal control of satlets and the electronics on the satlets.

It is an additional object of the present invention to provide thermal control of satlets and the electronics on the satlets without voluminous heat pipes and radiators.

Other features and advantages of the present invention will be appreciated by those skilled in the art upon reading the detailed description which follows with reference to the attached drawings.

BRIEF DESCRIPTION OF THE DRAWINGS

FIG. 4 is a side cut-away view of the male and female valve assemblies of the interface connector of the present invention wherein the male valve assembly piston is being actuated from a soft dock condition to an extended locking condition;

FIG. 5 is a side cut-away view of the male and female valve assemblies of the interface connector of the present invention wherein the male valve assembly piston has been extended so as to lock male and female valve assemblies together;

DETAILED DESCRIPTION OF THE PREFERRED EMBODIMENTS

Figure 1:
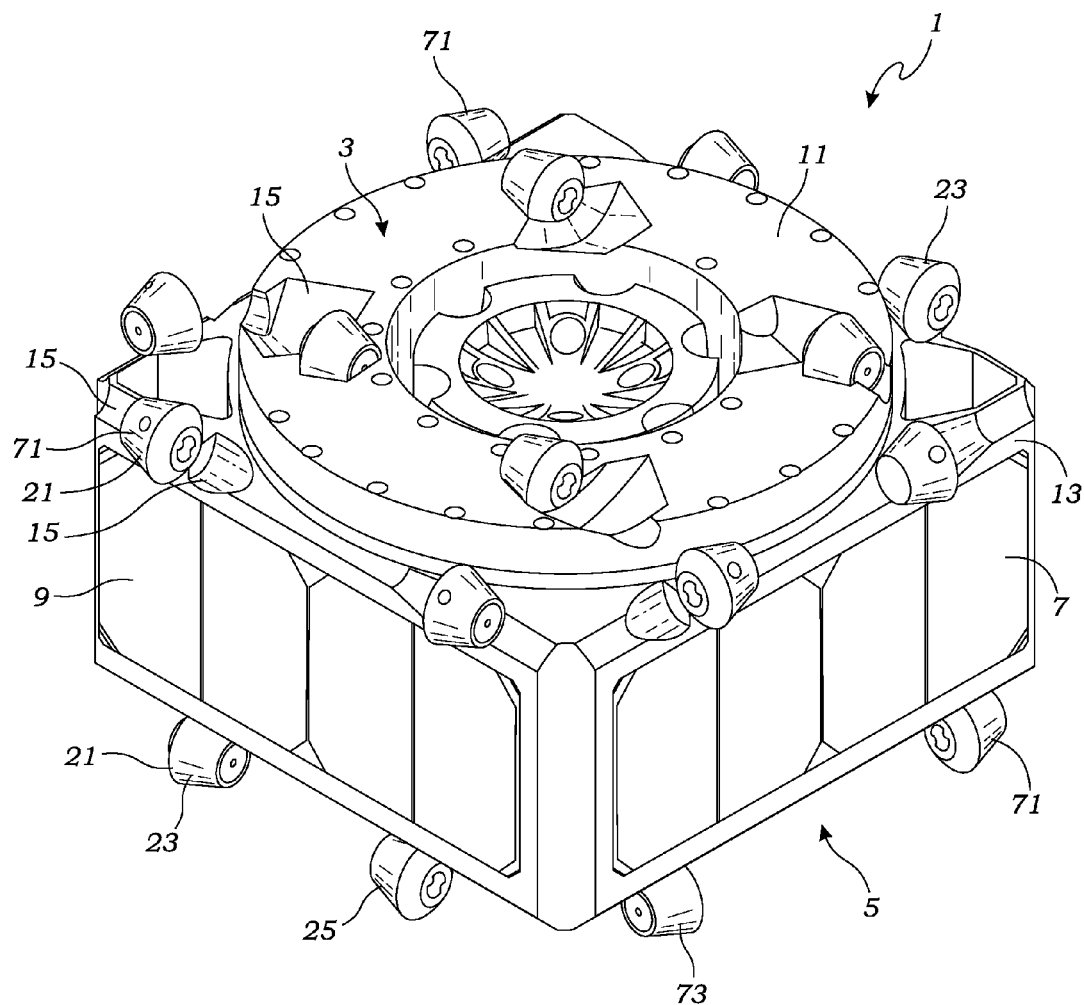
FIG. 1 is a perspective view of a satlet incorporating traditional spacecraft architecture with a plurality of unmated male and female valve assemblies of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 2:
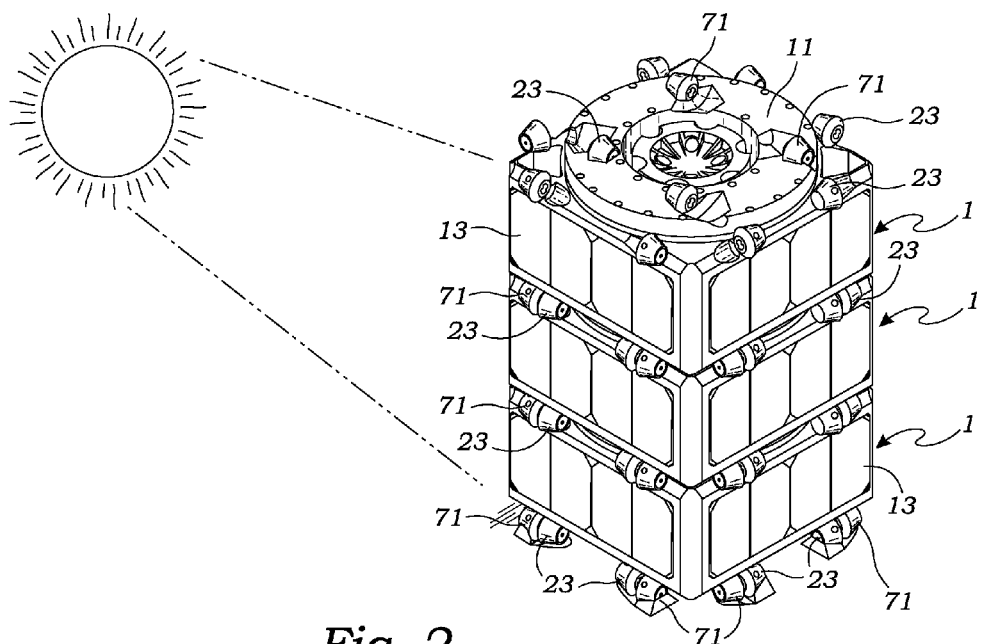
FIG. 2 is a perspective view illustrating three (3) satlets connected in a stacked condition utilizing the interface connectors of the present invention.
Figure 3:
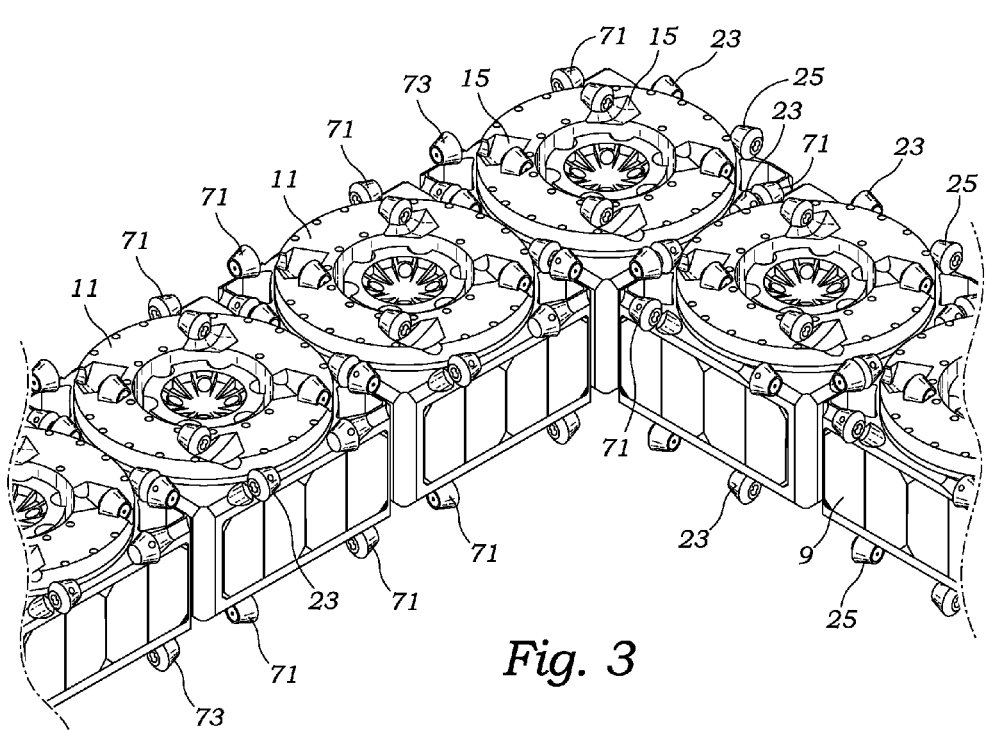
FIG. 3 is a top perspective view illustrating six (6) satlets connected side-by-side utilizing the interface connectors of the present invention.
Figure 6:
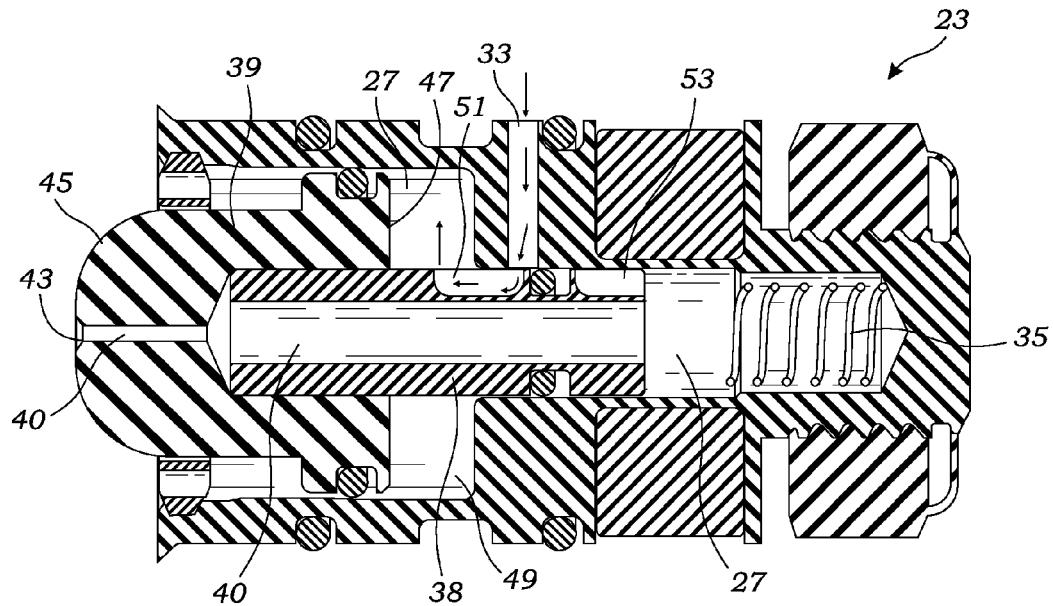
FIG. 6 is a side cut-away view of a male valve assembly of the present invention wherein the male valve assembly's piston is being actuated from a soft dock condition to an extended condition.
Figure 7:
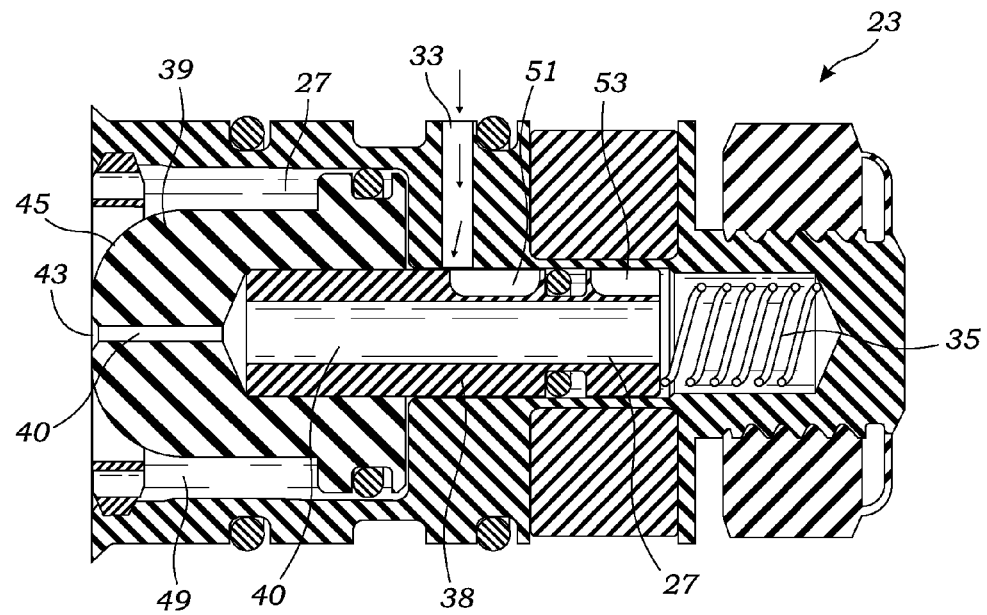
FIG. 7 is a side cut-away view of the male valve assembly wherein the male valve assembly's piston has been retracted.
Figure 8:
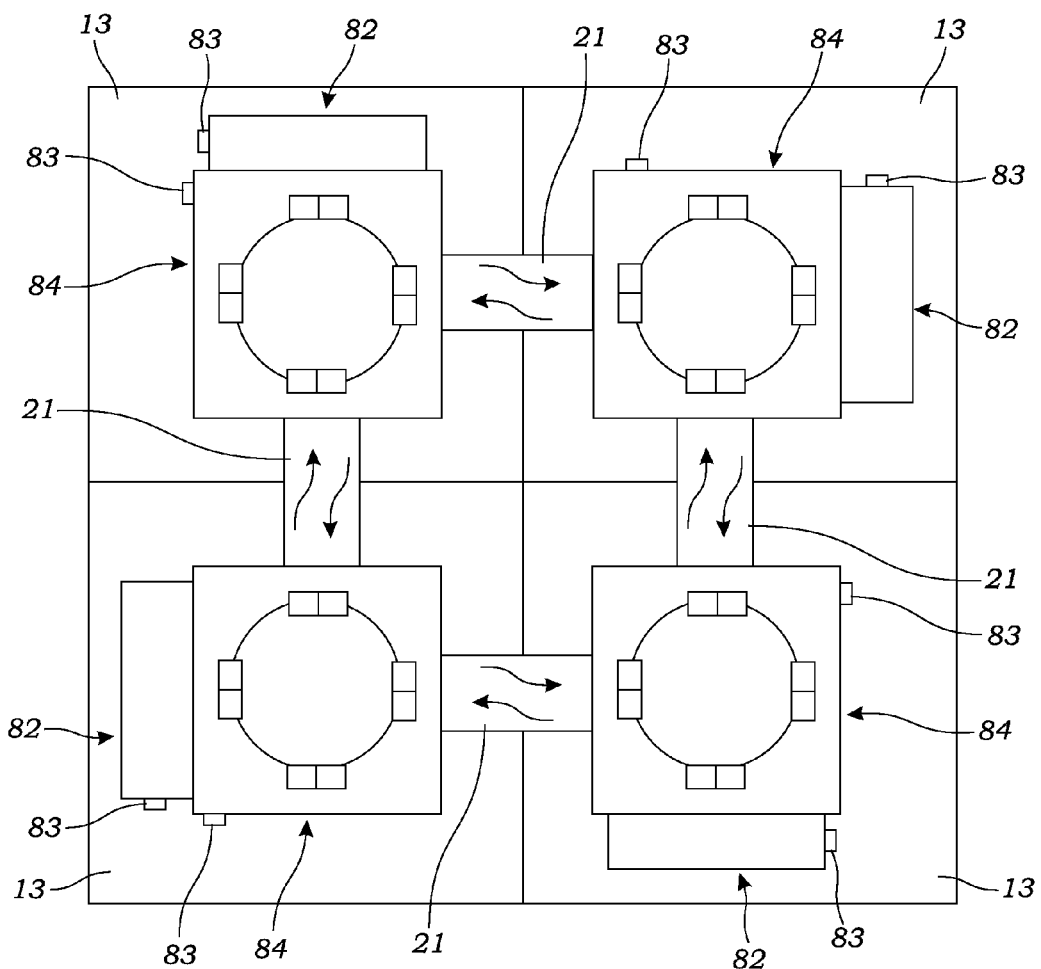
FIG. 8 is a diagram illustrating four (4) fuel tanks of four (4) satlets wherein each fuel tank includes an electronics circuit board coupled to that fuel tank.
Figure 9:
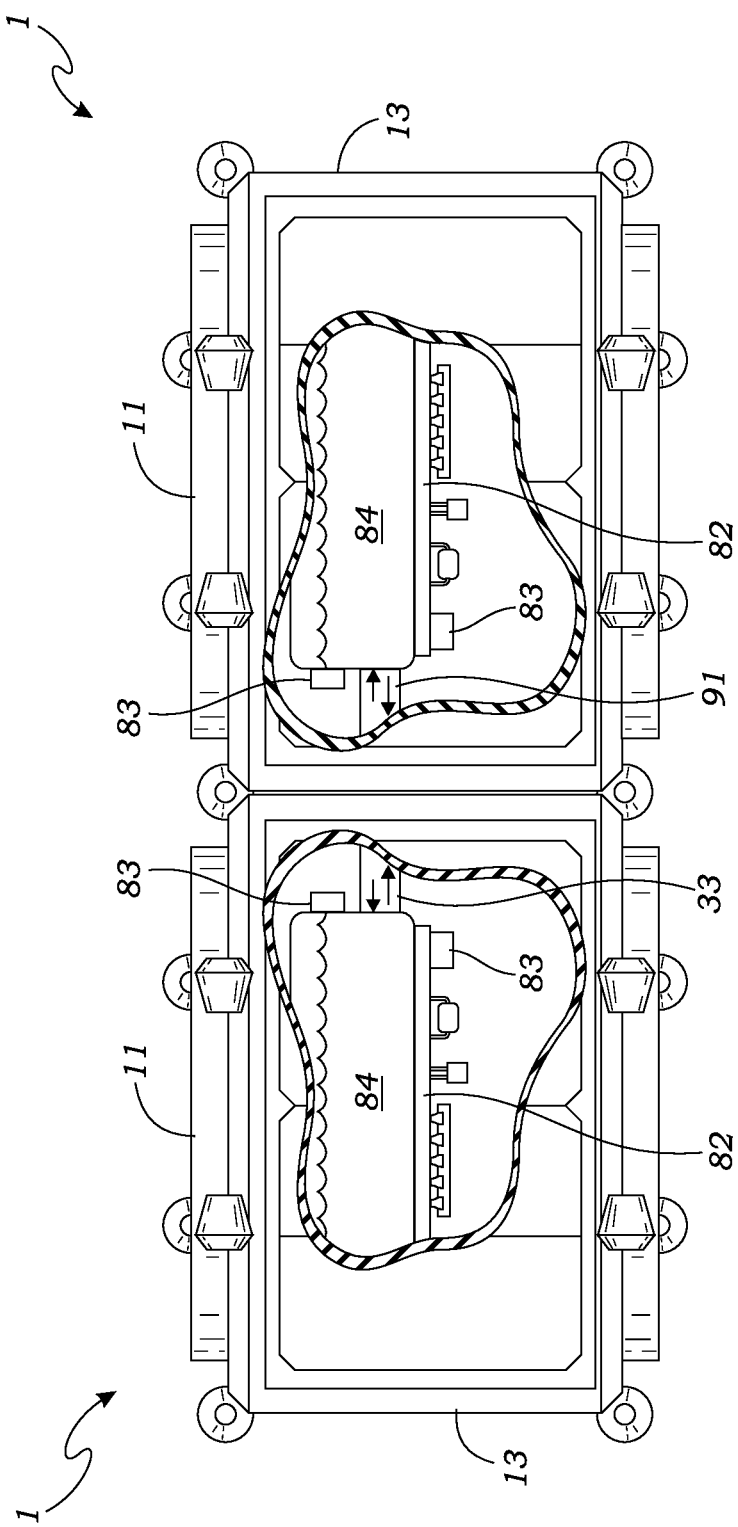
FIG. 9 is a side cut-away view of two (2) satlets connected side-by-side illustrating the satlets' electronics thermally coupled by conduction to the satlets' fuel tanks.

As illustrated in FIGS. 1-9, the method of cooling a satlet's electronics of the present invention includes aggregating a plurality of satlets 1 to form a spacecraft. As illustrated in FIGS. 1-3 a preferred satlet 1 has a top 3, a bottom 5, and four sides 7. Furthermore, each satlet 1 includes its own housing 13 that supports multiple spacecraft subsystems including solar panels 9, batteries, one or more actuator wheels (functioning as a momentum wheel and/or reaction wheel), image sensors, thermal control systems, propulsion system including a fuel tank 81 and thrusters, and electronics 82 for command and data handling, data sharing, attitude control, and position control. The satlets are constructed to thermally couple the electronics 82, including any circuit boards, to the satlet's fuel tank 84. For example, as illustrated in FIGS. 8 and 9, the electronics 82 may be positioned to engage the fuel tank's exterior to thereby be thermally coupled by conduction. Alternatively, though not shown in the Figures, the satlet's electronics may be positioned interior to the fuel tank and heat transfer may take place through convection between the electronics and propellant.

In addition to the satlet's being structurally connected, as illustrated in FIGS. 8 and 9, the satlet's 1 fuel tanks 81 are connected by fuel lines (33 or 91) and fluid connectors 21 so as to allow propellants to flow from one satlet to another. With reference also to FIGS. 1-7, the satlets further include open and closable valves (23 and 71) for permitting or obstructing the flow of propellant from one satlet to another. The satlets may contain pumps (not shown) to effect the transfer of propellant from one satlet to another. Alternatively, the opening of one or more valves may cause the propellant to flow from a high pressure region in either the first or second satlet to a low pressure region in an alternate satlet. Preferably, a controller is connected to the valves and pumps (if provided) to control the flow of propellant from the first satlet to the second satlet, or from the second satlet to the first satlet. The controller may be a general purpose computer or microprocessor including hardware and software as can be determined by those skilled in the art to provide automated or directed control of the fuel valves so as to open and close the valves to thereby control the flow of fuel from one satlet to another. The controller may be located within the electronics 82 of a single satlet 1, within the aggregate processing of the electronics 82 of two or more satlets, or at a remote location such as on the Earth at a control station.

With reference to FIGS. 8 and 9, in a preferred embodiment, the satlets have one or more temperature sensors 83 for determining the temperature or each satlet's electronics 82 and propellant within each satlet's fuel tank 84. In operation, the controller is connected to the temperature sensors 83 for determining if the temperature of a satlet's electronics 82 is reaching, has reached, or exceeds a predetermined threshold, or that the temperatures of the electronics of two connected satlets are unequal. For example, as illustrated in FIG. 2, the satlets with more exposure to the sun will have a higher temperature than a satlet with less exposure to the sun. If the controller determines that the temperature of the electronics is excessive, the controller directs the flow of propellant from a cooler satlet to a warmer satlet. Additionally, with reference to FIGS. 8 and 9, a satlet's electronics 82 may generate more heat than the electronics of another satlet, for example, due to the amount of processing performed by the respective electronics. The controller would then determine that a satlet's electronics is reaching, has reached, or exceeds a predetermined threshold. The controller then directs the flow of propellant from the satlet with a cooler propellant to the satlet having electronics reaching, having reached, or exceeding the predetermined threshold.

The aggregated satlets 1 may be structurally connected and connected for fluid, power and data transfer by various connectors as can be determined by those skilled in the art. However, with reference particularly to FIGS. 4-7, preferably the satlets 1 are connected by an interface connector 21 having particular usefulness in structurally connecting satlets 1, and for fluid transfer for thermal control of the satlet's electronics 82. Each satlet 1 has a housing 13 forming a frame upon which the interface connectors 21 are mounted. The interface connector 21 includes a male valve assembly 23 and a female valve assembly 71.

As best illustrated in FIGS. 1-3, the male valve assembly 23 has a tapered housing 25. The housing's tapered shape is considered ideal for in-space rendezvous and docking so as to self-align when received by correspondingly shaped beveled recesses 15 formed upon another satlet. As illustrated in FIGS. 4-8, the male valve assembly 23 includes a central bore 27. Preferably, the cylindrical bore has a circular cross-section. As illustrated in the figures, the central bore has a smaller diameter towards its proximal end 29 and a larger diameter at its distal end 31. Furthermore, the male valve assembly's central bore is connected to a fuel source such as by a fuel line 33 which radially projects through the valve assembly's housing towards the central bore's proximal end. Preferably, the fuel source is a fuel tank 84.

The male valve assembly 23 also includes a piston 37. As illustrated in the figures, a preferred piston is manufactured to include two components including a smaller diameter shaft 38 and a larger diameter piston head 39. Preferably, the piston head 39 has a diameter sufficiently large to form a substantially gaseous tight seal within the central bore 27. Furthermore, the piston may include an O-ring concentrically positioned around the piston head to form a gaseous tight seal between the piston head and the cylindrical surface of the central bore 27. Advantageously, the difference in diameter between the piston's shaft 38 and piston head 39 provides the piston head with a circular collar region 47. The smaller diameter shaft 38 slidably resides within the smaller proximal end 29 of the central bore 27. Meanwhile, the larger diameter piston head 39 slidably resides in the larger distal end 31 of the central bore 27. The piston 37 includes a central conduit 40 which extends the entire length of the piston through the shaft 38 and piston head 39. Preferably, the piston head 39 includes a divergent nozzle 43 forming the distal end of the central conduit 40.

The male valve assembly's piston 37 is capable of moving proximally and distally within the central bore 27. Movement of the piston can be actuated by various electrical or mechanical apparatus known to those skilled in the art. Applicant's preferred interface connector 21 includes a piston which is projected distally using pneumatic actuation, but moved proximally using an electromagnetic actuator. Moreover, it is preferred that the piston be maintained in a neutral central position by a helical spring 35 when not actuated proximally or distally.

To enable the piston 37 to be pneumatically extended, the piston shaft 38 has a first channel 51 which extends from the fuel line 33 into a chamber 49 formed behind the piston's collar 47 when the piston is in a neutral "soft dock" position. As illustrated in FIG. 4, the release of propellant through the fuel line 33, such as by opening a fuel valve (not shown), allows propellant to flow through the first channel 51 into chamber 49 so as to pneumatically force the piston distally. As illustrated in FIG. 5, the piston is forced distally until the first channel 51 is no longer in fluid communication with the fuel line 33. Preferably an O-ring 57 is provided to provide a fluid tight seal so as to prevent further propellant passing through the first channel 51 into chamber 49.

As illustrated in FIGS. 4-8, preferably the piston shaft 38 further includes a second channel 53 which comes into fluid communication with the fuel line 33 when the piston has been extended to a distal position. As illustrated in FIG. 5, the second channel 53 connects the fuel line 33 with the male valve assembly's central bore 27 at the central bore's proximal end 29 so as to allow propellant to flow through the fuel line into the central bore 27, and thereafter through the piston's central conduit 40, so as to be ejected from the piston's distal end 43.

To move the piston 37 in the proximal direction, the male valve assembly 23 includes a magnetic actuator including an electrical magnetic field generator, such as a coil winding 59 concentrically positioned around the piston's shaft 38. As understood by those skilled in the art, incorporating magnetic properties into the shaft 38 in cooperation with a controllable electromagnetic field provided by the magnetic field actuator 59 will cause the piston 37 to move in the proximal direction such as illustrated in FIG. 7.

As illustrated in each of the figures, the interface connector 21 also includes a female valve assembly 71 intended to connect with the male valve assembly 23. The female valve assembly 71 includes a tapered housing 73 which is also sized to be received and aligned within beveled recesses 15 formed within a satlet's housing 13.

As illustrated in FIGS. 4 and 5, the female valve assembly includes a central bore 77 having a proximal end 79 and a distal end 81. The distal end is closeable by a ball valve 83. The ball valve includes a ball 87, an O-ring 89 having an inner diameter smaller than the diameter of the ball, and a helical spring 85 for biasing the ball distally into the O-ring for creating a fluid tight seal. As understood by those skilled in the art, the helical spring 85 maintains the ball valve in a normally closed condition. However, movement of the ball 87 in the proximal direction, such as by engagement by a male valve assembly piston 37, will cause the ball valve to open. The female valve assembly further includes a fuel line 91 so that the female valve assembly's central bore 77 is connected to a fuel source (not shown). Preferably, the fuel source is a fuel tank 84.

As illustrated in FIGS. 4-8, a connector 21 of the present invention includes both a male valve assembly 23 connected to a female valve assembly 71. In a preferred embodiment, the interface connector 21 includes two sets of male and female valve assemblies. As illustrated in FIGS. 1-3, for this embodiment, the first and second male valve assemblies 23 are mounted, for example to a first satlet housing 13, in an outwardly facing coaxially aligned relationship to one another. More specifically, each male valve assembly's central bore 27 and piston 37 share the same axis and the male valve assemblies are mounted so that each piston extends outward from one another and each piston retracts toward each other. Meanwhile, the female valve assemblies are mounted to a second satlet housing in a manner wherein the female valve assemblies central bores are also coaxially aligned. However, the female valve assemblies are positioned to be inwardly facing, and aligned and spaced so as to connect with two male valve assemblies.

FIG. 4 illustrates a soft dock connection between a male valve assembly 23 and a female valve assembly 71. The male valve assembly's piston is maintained in a neutral condition by the spring 35. The male piston 37 projects partially into the female valve assembly's receptacle 62, but the piston is not extended so far as to engage the female valve assembly's O-ring 89 so as to form a fluid tight seal. Without introduction of a gas, such as a propellant, into the male valve assembly's chamber 49, the piston 37 can be displaced proximally relatively easily so as to allow engagement or disengagement of the male valve assembly to the female valve assembly. However, as illustrated in FIGS. 5 and 7, the introduction of propellant from fuel line 33 through first channel 51 into the male valve assembly's chamber 49 causes the piston 37 to move distally into the female valve assembly's receptacle 62 so as to engage and form a fluid tight seal with the female valve assembly's O-ring 89. Though not illustrated in the Figures, the piston conduit's distal end has a lateral slit across the divergent nozzle 43 so as to prevent a fluid tight seal between the piston's conduit 40 and the female valve assembly's ball 87. Thus, as illustrated in FIG. 5, when the male valve assembly piston has been moved to a distal "hard dock" position, gas is freely capable of flowing through the male and female valve assemblies, as controlled by a valve connected to the male valve assembly's fuel line 33. As would be understood by those skilled in the art, the opening of this valve causes propellant to flow from the high pressure region in either the first or second satlet, to the low pressure region in the first or second satlet. Furthermore, preferably the controller may control the propellant to flow from the first satlet to the second satlet, or from the second satlet to the first satlet.

Advantageously, the aggregation of the satlets 1 using the interface connectors 21 allows for the controllable flow of propellant from the first satlet to the second satlet, or from the second satlet to the first satlet to control the temperature of the satlets' electronics. Furthermore, where the spacecraft is constructed of three or more satlets, the controller can direct propellant throughout the spacecraft architecture to maintain thermal control of the electronics within each of the individual satlets.

While several particular forms of the invention have been illustrated and described, it will be apparent that various modifications can be made without departing from the spirit and scope of the invention. Therefore, it is not intended that the invention be limited except by the following claims. Having described my invention in such terms so as to enable person skilled in the art to understand the invention, recreate the invention and practice it, and having presently identified the presently preferred embodiments thereof

I claim:

1. A method for controlling the temperature of satlet electronics comprising the steps of:
   providing a spacecraft including at least a first satlet having a mechanical and fluid connection to a second satlet, each of the first and second satlets including a fuel tank storing a propellant, heat producing electronics which are thermally coupled to the satlet's fuel tank, and one or more temperature sensors for determining the temperature of the satlet's electronics and propellant;
   providing a controller connected to the temperature sensors for selectively transferring propellant between the first satlet's fuel tank and second satlet's fuel tank;
   determining that the temperature of the first satlet's electronics is reaching, has reached, or exceeds a predetermined threshold;
   determining that the temperature of the second satlet's propellant is lower than the temperature of the first satlet's electronics; and
   directing the flow of propellant from the second satlet's fuel tank to the first satlet's fuel tank to cool the first satlet's electronics.

2. The method for controlling the temperature of satlet electronics of claim 1 further comprising the steps of:
   determining that the temperature of the second satlet's electronics is reaching, has reached, or exceeds a predetermined threshold;
   determining that the temperature of the first satlet's propellant is lower than the temperature of the second satlet's electronics; and
   directing the flow of propellant from the first satlet's fuel tank to the second satlet's fuel tank to cool the second satlet's electronics.

3. The method for controlling the temperature of satlet electronics of claim 1 wherein the spacecraft includes at least three satlets.

* * * * *